Nov. 21, 1950 R. LARAQUE 2,530,884
INTERNAL-COMBUSTION ENGINE WITH OPPOSED PISTONS
Filed Jan. 30, 1947 10 Sheets-Sheet 5

FIG. 3

Nov. 21, 1950 R. LARAQUE 2,530,884
INTERNAL-COMBUSTION ENGINE WITH OPPOSED PISTONS
Filed Jan. 30, 1947 10 Sheets-Sheet 9

Nov. 21, 1950     R. LARAQUE     2,530,884
INTERNAL-COMBUSTION ENGINE WITH OPPOSED PISTONS
Filed Jan. 30, 1947     10 Sheets-Sheet 10

Patented Nov. 21, 1950

2,530,884

UNITED STATES PATENT OFFICE 2,530,884

INTERNAL-COMBUSTION ENGINE WITH OPPOSED PISTONS

Roland Laraque, Paris, France, assignor to L'Auxiliaire Industrielle, Paris, France, a corporation of France Application January 30, 1947, Serial No. 725,246
In France December 15, 1945

Section 1, Public Law 690, August 8, 1946
Patent expires December 15, 1965

3 Claims. (Cl. 123—51)

The present invention has for its object to provide a number of improvements in internal combustion engines of the type described in the French Patent No. 812,528 of October 26, 1936 and comprising in each horizontal cylinder thereof a pair of opposed pistons moved in reverse relationship to each other and actuating through the medium of suitable connecting rods and double-armed levers or rockers, a single crankshaft.

The engine to which the improvements forming the subject matter of this invention are applicable, is a two-stroke engine with equicurrent scavenging, the arms of each rocker being offset to each other in order to enable the crankshaft, for each cylinder, to be engaged by two crank pins suitably offset with respect to each other.

The new engine is more particularly characterized by the fact that each cylinder (containing a pair of opposed pistons) is in the form of a cylinder liner blocked within the engine housing by means of a single member which may either be a bushing designed to receive the injector holder, or said injector holder itself.

According to another feature of the invention, each rocker shaft is formed with flats and is blocked on the engine housing by means of simple tie-rods working exclusively under tension.

By means of the above dispositions it is simply necessary to remove the nuts from said blocking tie-rods to be in a position to draw out said shaft (by a transverse sliding movement) and to remove from the cylinder or cylinders the piston or pistons therein without it being necessary to dismantle the linkages.

Moreover, after having removed the bushing (or the injector holder) which blocks each cylinder liner in the engine, said liner may be removed by a mere axial sliding movement.

According to another feature of the invention, the crankpins corresponding to both homologous pistons in each cylinder are displaced by 180°, which offers certain advantages for the manufacture of the crankshaft while such symmetrical relation in no way impedes such operation of the ports that the exhaust ports are uncovered before the intake ports which are covered with a certain delay after said exhaust ports. There are thus obtained in suitably timed relationship the successive operations of exhaust, scavenging and filling with fresh air, effected under excellent conditions.

On the other hand and according to a further feature of the invention, the supercharger is incorporated in the engine itself and does not form a distinct unit separate from the power plant as is the case in prior art engines.

Finally in order to activate the circulation of water which is effected by thermo-siphon, the maximum degree of heating of the cooling water is effected around the exhaust. In this way there is provided a particularly efficient thermopump system.

Further features and characteristics of the improved engine according to the invention will appear from the ensuing description which relates to a form of embodiment shown by way of a nonrestrictive example in the appended drawing wherein:

Fig. 3 is a fragmentary section on line III—III of Fig. 2a.

Figure 1A:
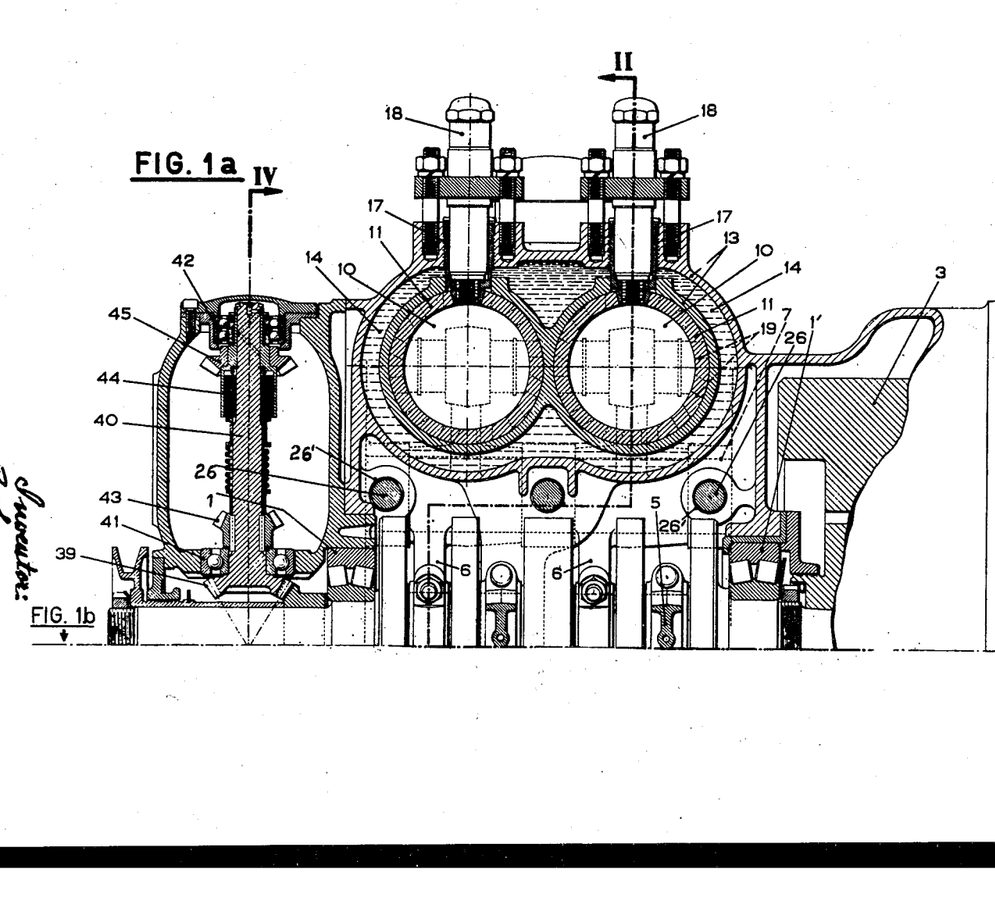
Figs. 1a and 1b are longitudinal cross sections of the engine on line I—I of Figs. 2a and 2b.
Figure 1B:
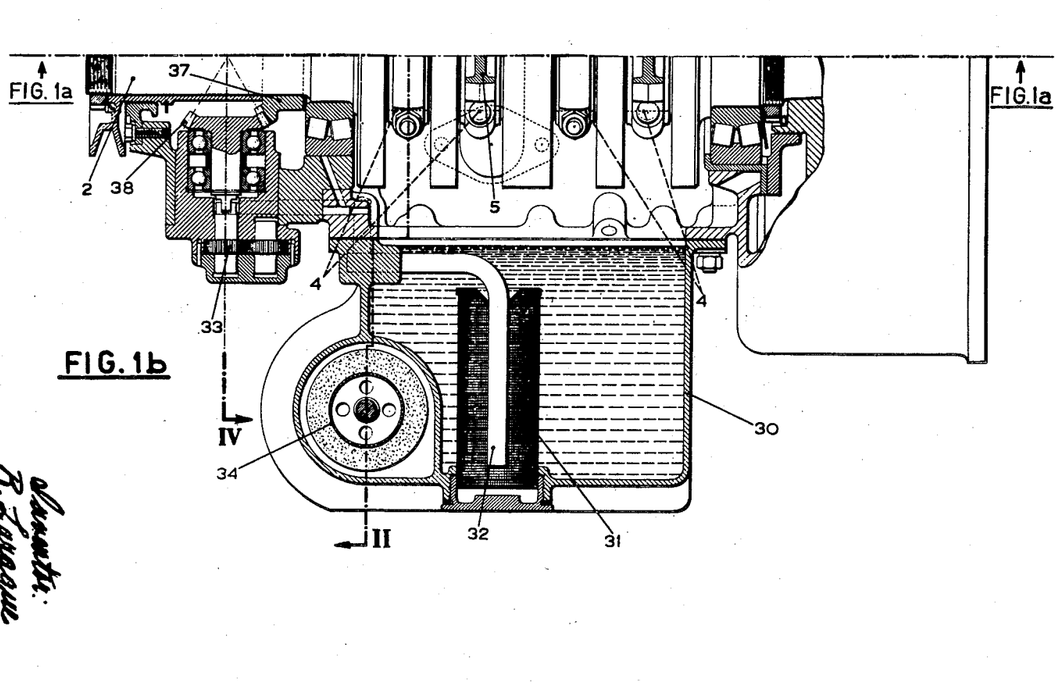
Figure 2A:
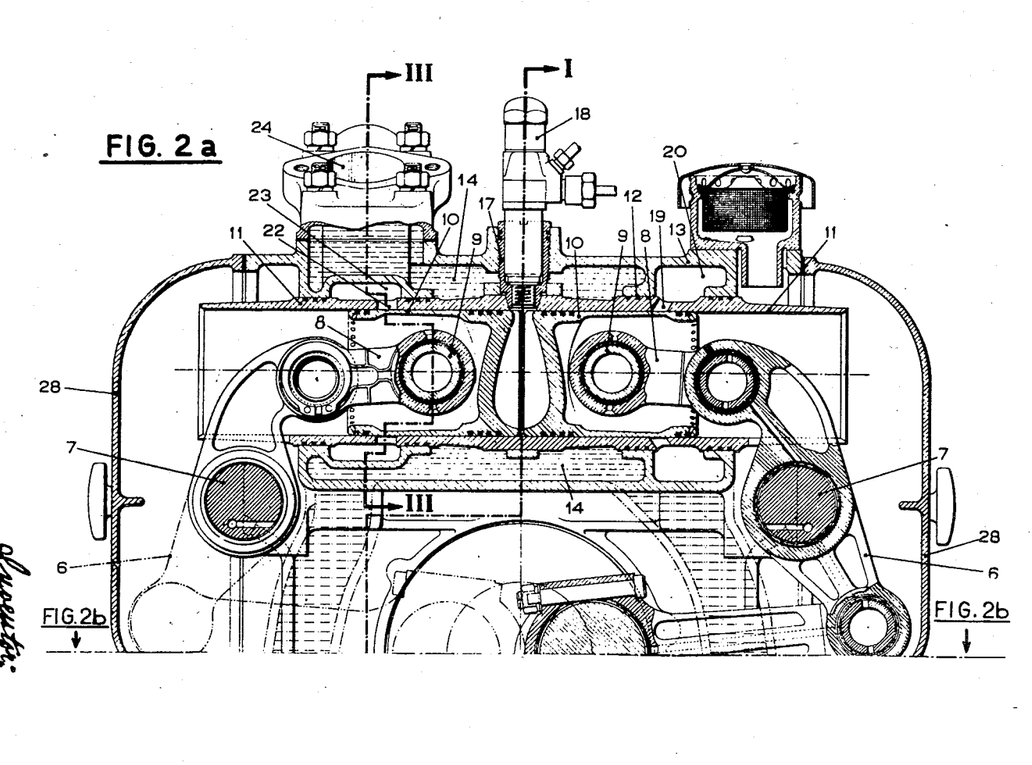
Figs. 2a and 2b are cross sections on line II—II of Figs. 1a and 1b.
Figure 2B:
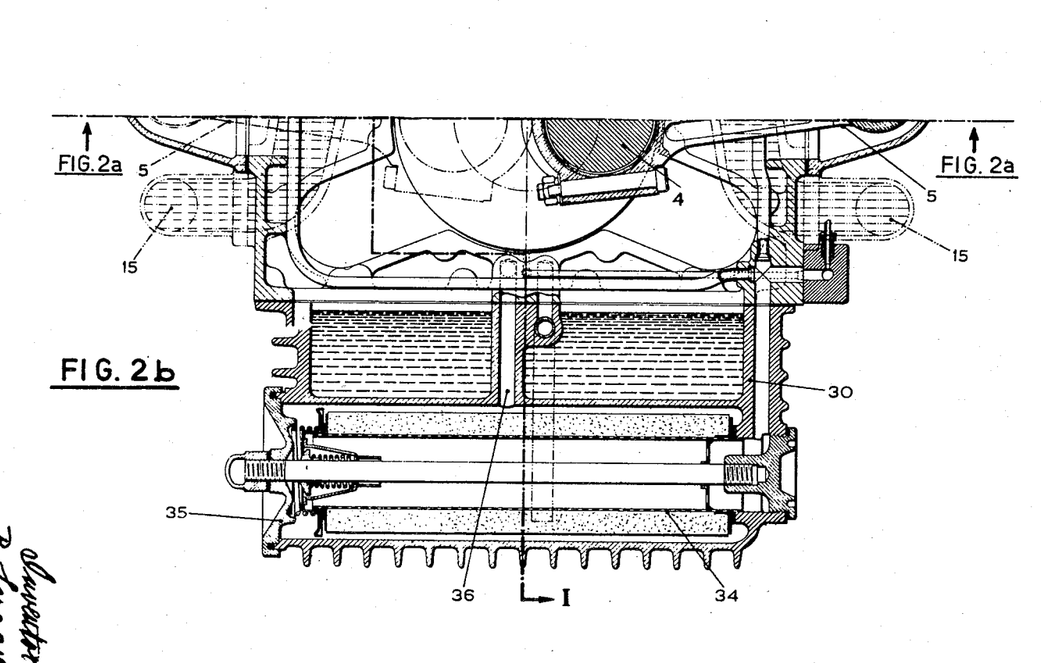
Figure 3:
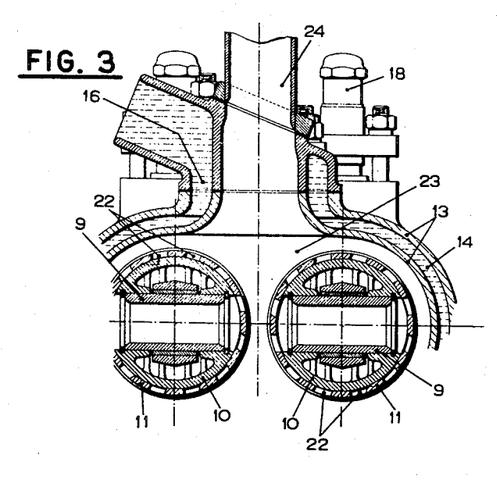
Figure 4A:
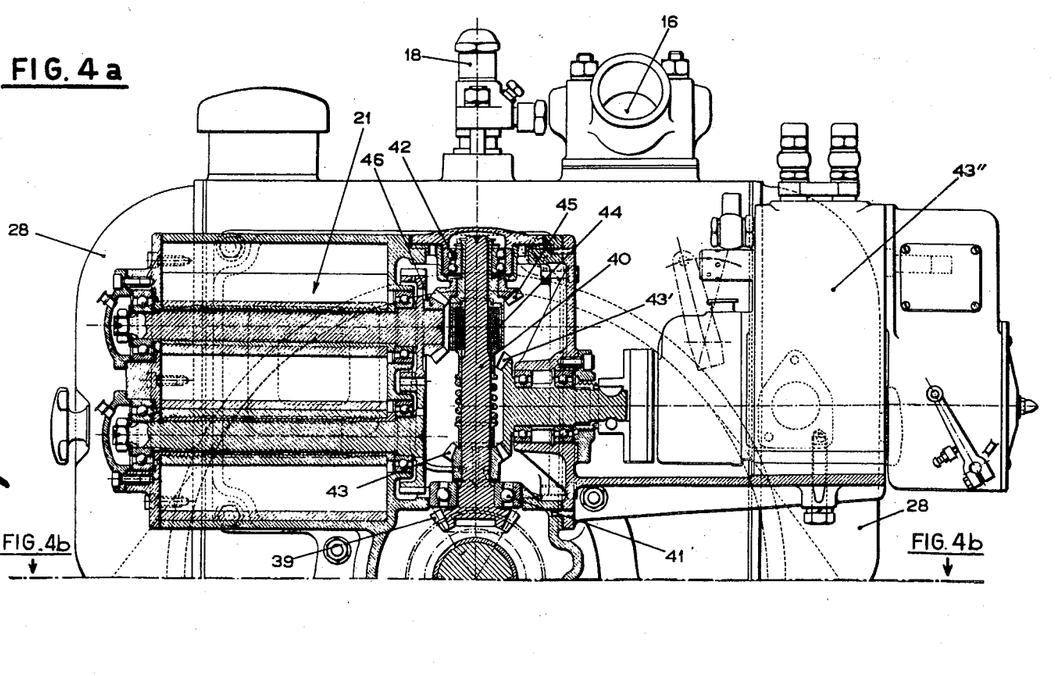
Figs. 4a and 4b are sections substantially through the plane of line IV—IV of Figs. 1a and 1b.
Figure 4B:
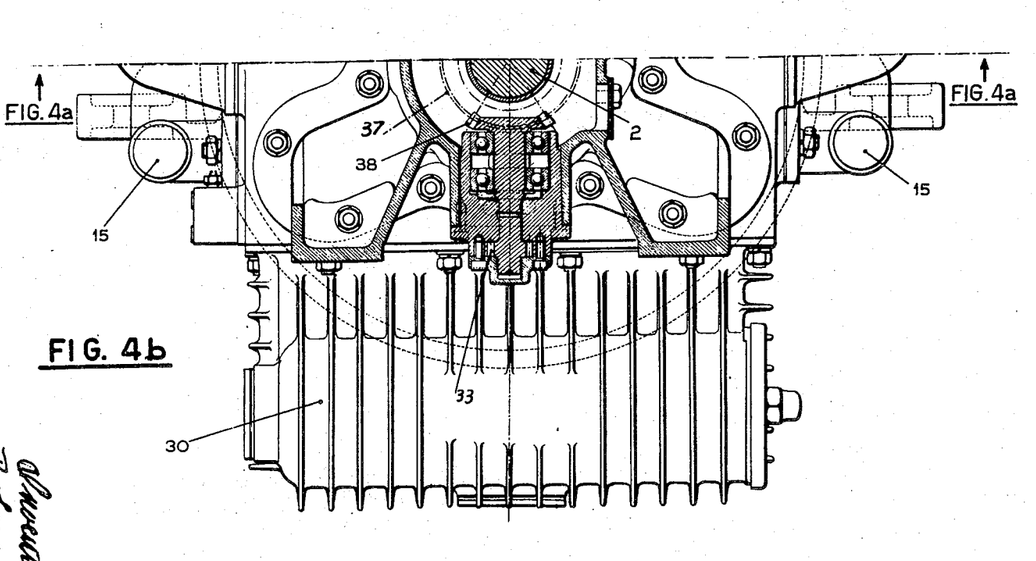
Figure 5:
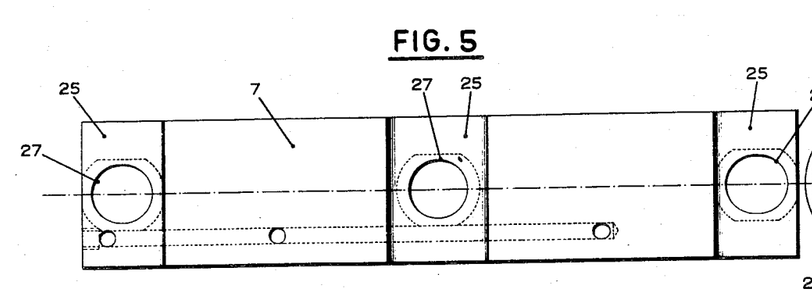
Fig. 5 is an elevation of one of the rocker shafts.
Figure 6:
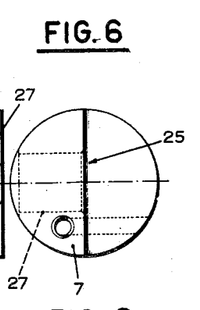
Fig. 6 is an end view of Fig. 5.
Figure 7:
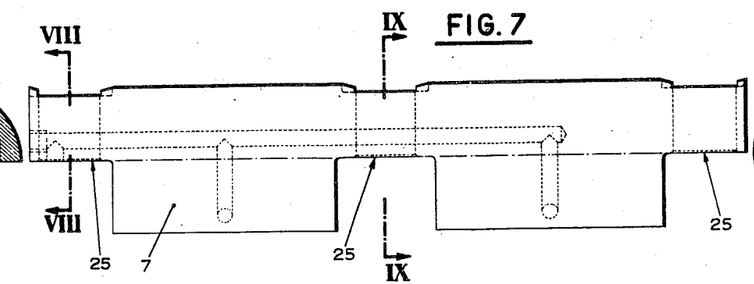
Fig. 7 is a view of the rocker shaft rotated through 90° with respect to Fig. 5.
Figure 8:
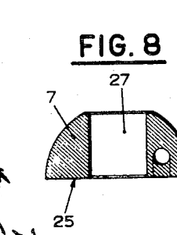
Fig. 8 is a section on line VIII—VIII of Fig. 7.
Figure 9:
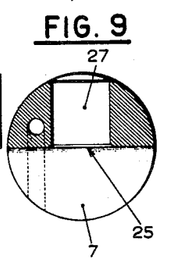
Fig. 9 is a section on line IX—IX of Fig. 7.

As shown in the appended drawing and according to the invention, the improved engine which in this example is of the two-stroke type with two cylinders and four pistons in opposed pairs, comprises, supported by suitable anti-friction bearings 1 and 1' a crankshaft 2, one end of which (the right hand end as shown in Fig. 1) supports the fly wheel 3 (with the clutch device). The crankshaft 2 carries a number of crank pins 4 (four in the example shown). On each crank pin is pivoted the end of a connecting rod 5 the opposite end of which is pivoted to one arm of a rocker 6 pivoted on a fixed axis 7, the opposite arm of said rocker which is slightly offset in relation to the first-mentioned arm being pivoted to a connecting rod 8 mounted on the wrist pin 9 of the piston 10. The arrangement is the same for all four pistons.

The offset relationship of the arms of each rocker 6 is such that one end of each rocker is in front of its associated crank pin while the other end is in front of the related piston.

Each cylinder 11 in which two pistons are movable is in the nature of a liner inserted with interposal of seal-rings 12 of suitable material in a cylinder block or housing 13 which defines with the respective cylinder, water circulating chambers 14. The cooling water is conducted to said chamber 14 through the medium of tubes 15.

According to an essential feature of the invention, each cylinder liner 11 is blocked in the cylinder block by a single securing means which in the present instance is formed by a bushing 17 the frustoconical end of which engages a complementary frustoconical aperture formed in the cylinder, said bushing being adapted to receive the tip of the injector 18.

Each cylinder comprises toward one end thereof an annular series of ports 19 which open into an annular channel 20 receiving the scavenging air from supercharger 21. Towards the opposite end, the cylinder liner 11 has an annular series of exhaust ports 22 which open into an annular channel 23 connecting with the exhaust manifold 24.

Figure 11:
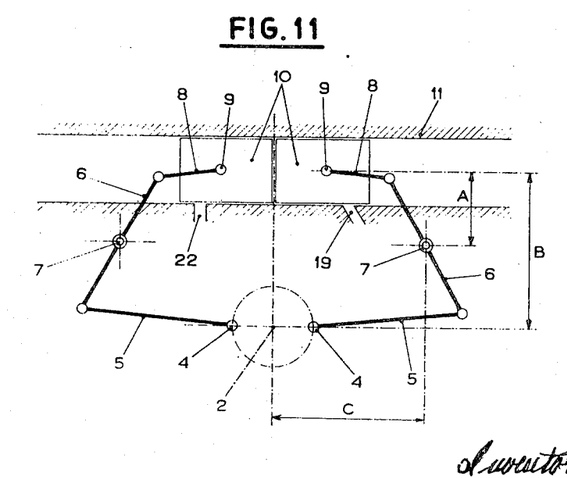
Fig. 11 schematically shows the linkage associated with both pistons of one cylinder together with the arrangements of the intake and exhaust ports.
Figure 12:
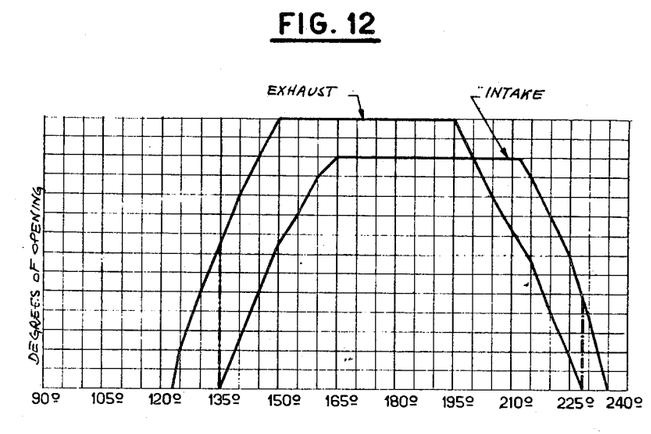
Fig. 12 finally shows a timing diagram for a cylinder.

According to an important feature of the invention the crank pin 4 related to the corresponding pistons of the same cylinder are in 180° phase displaced relation to each other. This arrangement is particularly desirable in connection with the machining of the crankshaft. Furthermore by a suitable choice for the distance A (Fig. 11) between the cylinder axis and the rocker axis, B between the cylinder axis and the crankshaft axis, C between the rocker axis and the (vertical) plane of symmetry of the engine, there is obtained as shown in the diagram of Fig. 12, a proper timing. That is, by a judicious selection for the ratios A/B and A/C (which in the engine as constructed by the applicant respectively have the values 0.46 and 0.47 but which could of course be varied within certain limits), the timing diagram of Fig. 12 shows that a considerable advance of the exhaust with respect to intake is obtained and that this is true both when the respective ports 22 and 19 are opened and closed respectively. There is thus obtained an exhaust followed by an efficient scavenging action followed in turn by a suitable filling of the cylinder with fresh air.

According to another feature of the invention, the exhaust section of the engine, with which connects the exhaust manifold 24 is entirely surrounded by a cushion or body of water 16 immediately downstream of which is located the pipe leading to the radiator. There is thus obtained a thermo-pump effect which greatly activates the circulation of cooling water by thermo-siphon effect.

Figure 10:
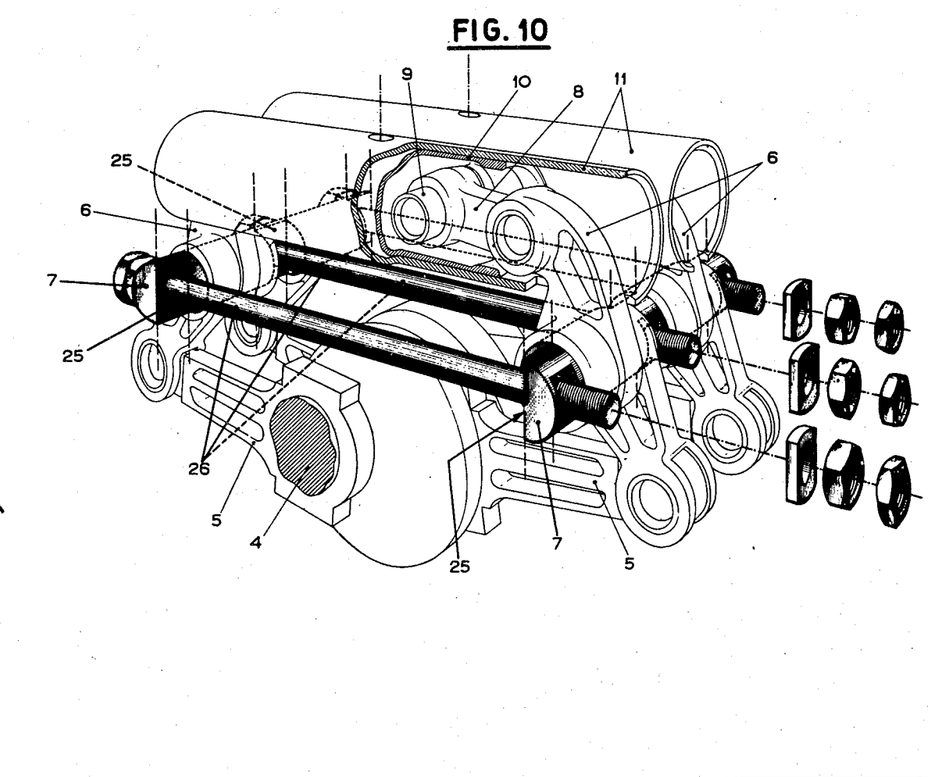
Fig. 10 is a schematic perspective view more particularly illustrating the way in which the rocker shafts and the tie-rods are secured to the engine housing.

Each of the rocker-shafts 7 arranged to either side of the plane of symmetry of the engine comprises as more particularly illustrated in Figs. 5 to 9, a number of flats 25 milled to a diametric plane of the shaft and enabling said shaft to be mounted in engagements with complementary flats machined in the engine housing and to be blocked thereagainst through the medium of simple tie-rods 26 which extend through apertures 26' formed in the housing and apertures 27 provided in the shafts 7 at the location of each flat 25. This arrangement which is more particularly apparent in the perspective view of Fig. 10 provides for ready assembly and disassembly of rocker shafts 7 which may, after the nuts on the threaded ends of tie-rods 26 have been loosened, withdrawn from the bores in the rockers by a simple transverse sliding movement. The shafts 7 are moreover provided with the usual channels for the supply of lubricating oil under pressure.

Where the rockers and rocker-shafts are located, the engine is closed by removable covers 28.

In the lower portion of the engine housing is an attached housing 30 forming an oil sump and accommodating the various filters. The oil which is in sump 30 and which is discharged from the various movable elements of the engine, first flows through a filter 31 whence it is sucked up, through the medium of a plunger tube 32, by the gear pump 33. After discharge from pump 33 the oil next flows through a drum filter 34 with a felt lining, said filter being withdrawable from its housing as a result of the provision of a removable cover 35. The strained oil is then discharged through the conduct 36 to feed the various elements of the engine.

At the end of the crankshaft remote from the fly wheel 3 said crankshaft carries a bevel annular gear 37 meshing with a bevel pinion 38 connected to the lubricating pump 33.

Annulus 37 moreover meshes with a pinion 39 (opposed to pinion 38) rigid with shaft 40 rotatably supported through suitable anti-friction bearings 41 and 42 in an auxiliary housing. Shaft 40 rigidly supports a bevel pinion 43 meshing with pinion 43' of the injection pump 43''. On the shaft 40, is further mounted with the interposal of a torque limiting device 44 a pinion 45 meshing with the drive pinion 46 for supercharger 21 which is of the vaned type, said supercharger being according to a feature of the invention incorporated in the engine itself. The interposal of torque limiting device 44 averts the risk of breakage in the drive transmitting elements, etc. in the event of a breakdown and brutal stoppage of the supercharger.

It will be quite obvious that the exemplary embodiment of the engine as described above and illustrated in the appended drawing is given by way of indication only and not of limitation and that the engine may be subject to any modification or details within the scope of the invention.

It will be understood in particular that the engine may include any desired number of cylinders rather than the two cylinders as shown in the herein described examples.

What I claim is:

1. Internal combustion engine comprising in combination a recessed cylinder housing, a generally horizontal cylinder liner mounted a friction fit in a recess of said cylinder housing, blocking means for blocking said cylinder liner with respect to said housing substantially at the longitudinal mid-point of said liner, a pair of co-operating pistons reciprocable in said liner in mutually opposed relationship, a crankshaft for said engine and a pair of co-operating crankpins on said crankshaft, connecting rods pivoted on said crankpins, respective rocker means each pivoted at one end to each of said connecting rods and at the other end to each of said pistons, fixed shafts for rotatably mounting said rockers intermediate their ends, flats milled in spaced relationship on said rocker shafts, adapted to co-operate with complementary flats formed in said housing, holes formed through said rocker shafts in said flats thereon, tie-rods engaged in said rockershaft holes to immobilize said rocker shafts in said housing, said rocker shafts related to both pistons of said cylinder being arranged equidistant with respect to the transverse central plane of said cylinder liner, means pivotally connecting the free ends of each of said rockers to each of said pistons and internal combustion means to reciprocate said pistons in said cylinder.

2. An internal combustion engine comprising in combination a recessed cylinder housing, a generally horizontal cylinder liner mounted in a recess of said housing, blocking means for said liner substantially longitudinally centrally of said liner, a pair of co-operating pistons reciprocable in said liner in mutually opposed relationship and internal combustion means to so reciprocate said pistons, a crankshaft for said engine and a pair of co-operating crankpins on said crankshaft in 180° phase displaced relationship to each other, connecting rods pivoting on said crankpins, respective rocker means pivoted intermediate their ends on a fixed axis in said housing and with one end pivotally connected to each of said connecting rods and with the other end pivotally connected to each of said pistons, water-circulating means associated with said cylinder in said housing, an exhaust connection in said engine, said water-circulating means being so adapted that said exhaust connection is substantially surrounded by a body of cooling water whereby to heat said cooling water to its maximum temperature just before said water is discharged from said engine, to activate said water circulation by thermo-siphon.

3. In an internal combustion engine the combination comprising an engine block a cylinder positioned in said block, a pair of opposed pistons located in said cylinder, rocker axles having certain flat surfaces with holes therein cooperating with corresponding flat surfaces upon said block, said block having holes at said flat surfaces in alignment with said first mentioned holes and tie rods extending thru said holes holding said axles against said block and connecting said axles to one another whereby strains on said axles are absorbed mainly by said rods.

ROLAND LARAQUE.

REFERENCES CITED

The following references are of record in the file of this patent:

UNITED STATES PATENTS

| Number | Name | Date |
|---|---|---|
| 2,054,232 | Schneider et al. | Sept. 15, 1936 |
| 2,079,156 | Danckwortt | May 4, 1937 |
| 2,113,990 | Laraque | Apr. 12, 1938 |
| 2,134,811 | Church | Nov. 1, 1938 |
| 2,166,211 | Gray | July 18, 1939 |
| 2,262,264 | Addison et al. | Nov. 11, 1941 |
| 2,398,640 | Hickey | Apr. 16, 1946 |